Sept. 19, 1967  H. M. BLINN  3,342,122
COOKING DEVICE
Filed May 5, 1965
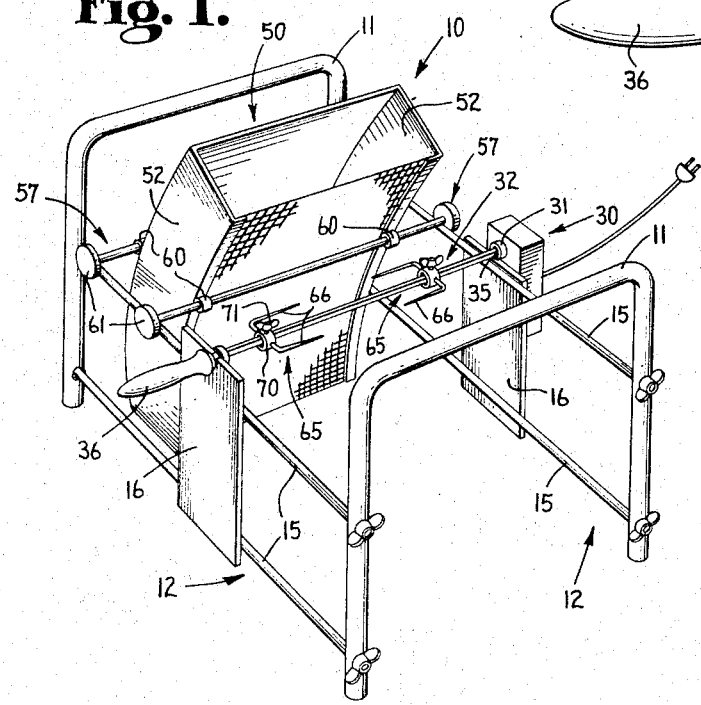
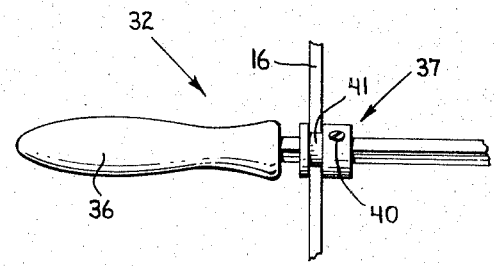
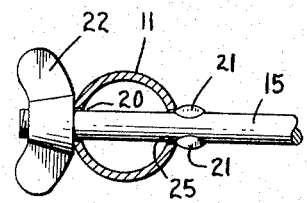
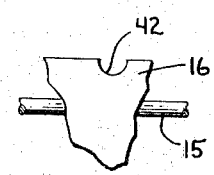
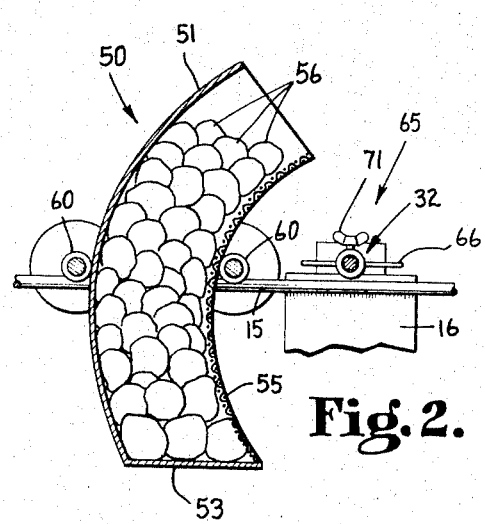
INVENTOR.
HERBERT M. BLINN
BY Lockwood, Woodard, Smith & Weikart
Attorneys

United States Patent Office 3,342,122
Patented Sept. 19, 1967

3,342,122
COOKING DEVICE
Herbert M. Blinn, Indianapolis, Ind., assignor of one-half to William Jakelsky, Carmel, Ind.
Filed May 5, 1965, Ser. No. 453,315
3 Claims. (Cl. 99—421)

The present invention relates to a cooking device.

One of the most pleasant of present day diversions is the cooking of steaks, hamburgers, hot dogs and the like on a grill by amateur frequently male chefs. Usually the grilling procedure is accomplished out of doors because of the substantial amount of smoke involved and the ever present danger of fire. Various types of grills have been devised which incorporate mechanisms, most being difficult to operate, for raising and lowering the grill relative to the hot coals. These mechanisms do not, however, remove the danger of a fire caused by grease dripping onto the hot coals. Such a fire may destroy the entire main course of the meal particularly when a relatively inexperienced chef is involved.

Certain prior art devices incorporate means for avoiding the dripping of grease on the hot coals. These devices, however, are not entirely satisfactory for various reasons. First, they do not permit the meat to be seen as it cooks. Thus, they are in effect nothing more than a conventional oven. Second, they do not provide for easy adjustment of the amount of radiant heat delivered to the meat by the hot coals. Third, they do not provide a means for continuously moving the meat to insure even delivery of heat to all sides thereof. Fourth, they are relatively expensive and complicated in construction.

It is therefore an object of the present invention to provide an improved cooking device.

Another object of this invention is to provide a cooking device which permits the meat to be seen as it cooks and which provides for easy adjustment of the amount of heat delivered to the meat by the hot coals.

A further object of this invention is to provide a cooking device which provides means for continuously moving the meat to insure even delivery of heat to all sides thereof.

Still other objects of this invention are to provide a cooking device which is inexpensive in construction; to provide a cooking device which is not susceptible to fire; and to provide a cooking device which is particularly adapted for use in a conventional fireplace.

Related objects and advantages will become apparent as the description proceeds.

One specific embodiment of the present invention might include a frame, a spit rotatably mounted on said frame, power means coupled to said spit for rotation thereof, a charcoal basket mounted on said frame in horizontally spaced relation to said spit and adjustable axially of said spit and toward and away from said spit, said basket having a curved configuration cupped about said spit and having a concave foraminous face of part-cylindrical configuration facing toward said spit with said spit located generally at the axis of said part-cylindrical configuration.

The full nature of the invention will be understood from the accompanying drawings and the following description and claims.

FIG. 1 is a perspective view of a cooking device constructed according to the present invention.

FIG. 2 is a vertical longitudinal fragmentary section taken through the device of FIG. 1.

FIG. 3 is an enlarged fragmentary section taken through one of the legs of the device of FIG. 1 and showing more details of frame construction of the embodiment of FIG. 1.

FIG. 4 is an enlarged fragmentary top plan of the structure of FIG. 1.

FIG. 5 is a fragmentary side elevation of the left side of the structure of FIG. 1 with the spit removed therefrom.

FIG. 6 is an enlarged side elevation of a shaft used to support the charcoal basket of FIG. 1.

For the purposes of promoting an understanding of the principles of the invention, reference will not be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a cooking device 10 which includes a pair of U-shaped tubular bars 11 fixed in spaced parallel relation by side structures 12. Each of the side structures 12 includes a pair of rods 15 fixed in spaced parallel relation by a rectangular member 16 welded to the rods 15 centrally thereof. Referring to FIG. 3, each of the rods 15 is threaded at its distal ends 20 and is deformed or pinched at 21 adjacent its distal ends to provide an abutment adapted to be held tightly against a respective U-shaped bar 11 by means of a wing nut 22. Each of the U-shaped bars is provided with four bores 25 which extend all the way through the U-shaped bars and receive respective ones of said rods. It can be appreciated that the frame structure including the side structures 12 and the U-shaped bars 11 provides a sturdy foundation for the operating portions of the present apparatus whereby the present apparatus is easily assembled for use and disassembled for storage.

An electric motor 30 is mounted on one of the rectangular members 16 and has an output drive member 31 formed for removable coupling to a spit 32. The spit 32 is rectangular in cross section and is received within a rectangular recess 35 in the output drive member 31. The spit 32 has a handle 36 preferably made of wood or the like which permits the spit to be lifted off of the apparatus without burning the hand and to be conveniently mounted on the apparatus. An annular member 37 having an internal square shaped cross section is received on the spit and is fixed in position by a set screw 40. The annular member 37 has an external annular groove 41 which rests in a recess 42 (FIG. 5) in the upper edge of one of the rectangular members 16. The member 37 functions to maintain the spit coupled within the output drive member 31 of the electric motor 30.

A further important feature of the present invention is the charcoal basket 50 which has a curved configuration generally cupped around the spit 32. The charcoal basket 50 has a closed rear 51, sides 52, and bottom 53 but also has a foraminous forward face which may be formed of screen wire or of expanded metal or the like. The forward face 55 is curved in a part-cylindrical configuration with the axis of said part-cylindrical configuration being located in the vicinity of the spit. It can be seen that the curved shape and the curved foraminous forward face of the charcoal basket permits the charcoal 56 within the basket to deliver radiant heat to meat or the like on the spit throughout a substantial area of the meat but does not permit the meat to drip grease on the charcoal basket because of its horizontal spacing in relation to the spit. The closed bottom rear and sides of the charcoal basket aid in concentrating the heat output to or from the foraminous forward face.

The charcoal basket is mounted on the side structures 12 and particularly upon the upper rods 15 thereof by means of shafts 57. The charcoal basket is formed with four rings 60, two being mounted on the face of the charcoal basket and two on the rear thereof. The rings slidably receive the shafts 57 whereby the charcoal basket can be adjusted axially of the spit to better position the basket for cooking an object mounted on the spit. The shafts 57 each have enlarged heads 61 and 62 at the opposite ends thereof with one of the heads 62 being capable of being unscrewed from the shaft 57 in order to disassemble the shaft from the charcoal basket for cleaning or the like. Of course, the fact that the rods 57 rest upon the upper rods 15 permits the basket to be easily adjustable toward and away from the object being cooked in order to vary the rate of delivery of heat to the object.

Mounted upon the spit 32 are means 65 for impaling the piece of meat or the like and fixing it in position on the spit so that the meat rotates with the spit. The means 65 each include a pair of tines 66 which project from a pair of annular members 70 each having an aperture therethrough of square cross section. Each of the members 70 is also provided with a suitable thumb screw 71 for locking the means 65 in place on the spit.

It will be evident from the above description that the present invention provides an improved cooking device which permits the meat to be seen as it is cooked. Thus, the present apparatus can be placed within a conventional fire place with the foraminous face 55 facing outwardly of the fireplace to provide the pleasant appearance of hot coals in the fireplace. Also the object being cooked on the spit is fully visible when the cooking device is so positioned. It will also be evident that the present invention provides cooking apparatus which permits easy adjustment of the amount of heat delivered to the meat as well as means for continuously rotating the meat to insure even delivery of heat to all sides thereof. It has been found by actual operation of the present device that it can cook a relatively large piece of meat in much less time than necessary to oven cook the meat and that the resulting cooked product is just as tasty, if not more so, than meat cooked on a grill or in other ways. In actual operation of the present apparatus a pan should be placed below the meat to catch grease drippings therefrom.

A further concept embodied in the invention is the use of baskets of differing size. Thus a single basket might be supplied which is adjustable as to size or a plurality of different sized baskets might be supplied. One purpose of such an arrangement would be to save charcoal so that a small amount of charcoal could be used for a small piece of meat and a large amount of charcoal for a large piece of meat. Also if the size of the heating face of the basket is variable, a large heating face can be presented to a larger piece of meat and a smaller heating face to a smaller piece of meat.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A cooking device comprising a pair of U-shaped bars each having four bores therethrough with two bores in one leg of each U-shaped bar and two bores in the other leg of each U-shaped bar, a pair of said structures each including a pair of rods fixed in parallel spaced relation by a rectangular member welded to the rods centrally thereof, each of said rods being threaded at its distal ends and deformed adjacent its distal ends to provide abutments, each distal end of said rods being projected through a respective one of said bores, a plurality of nuts each received on a respective one of said threaded distal ends and drawing up said abutments against said U-shaped bars to provide a rigid assembly with said U-shaped bars forming the end portions thereof and said side structures forming the side portions thereof, a motor mounted on one of said rectangular members and having an output drive member which is formed for removable coupling to a spit, a spit having a handle on one end thereof, means slidable along and securable to said spit at any desired location along the length thereof for impaling an object to be cooked and fixing it against rotation relative to the spit, an annularly externally grooved member adjustably fixed to said spit, the other of said rectangular members having a semicircular recess in the upper edge thereof receiving the grooved member within the groove thereof thereby retaining said spit in said electric motor output drive member, a charcoal basket having closed sides and rear and having a foraminous forward face, said charcoal basket face being curved about a horizontal axis in a cylindrical configuration and cupped about said spit, and means adjustably supporting said basket on said side structures.

2. A cooking device comprising a pair of U-shaped bars, a pair of side structures each including a pair of rods fixed in parallel spaced relation by a rectangular member welded to the rods centrally thereof, each distal end of said rods being secured to said U-shaped bars to provide a rigid assembly with said U-shaped bars forming the end portions thereof and said side structure forming the side portions thereof, an electric motor mounted on one of said rectangular members and having an output drive member which is formed for removable coupling to a spit, a spit having a handle on one end thereof, means slidable along and securable to said spit at any desired location along the length thereof for impaling an object to be cooked and fixing it against rotation relative to the spit, an annularly externally grooved member adjustably fixed to said spit, the other of said rectangular members having a semicircular recess in the upper edge thereof receiving the grooved member within the groove thereof thereby retaining said spit in said electric motor output drive member, a charcoal basket having closed sides and rear and having a foraminous forward face, said charcoal basket face being curved about a horizontal axis in a cylindrical configuration and cupped about said spit, four rings mounted on said basket two on the rearward face thereof, a pair of shafts each having enlarged heads on the opposite ends thereof, said shafts each extending through a respective two of said rings to mount said basket on said shafts, said shafts resting on said side structures and movable thereon to adjust the position of said basket relative to said spit, said basket being slidable on said shafts to adjust the position of said basket relative to said spit.

3. A cooking device comprising a pair of U-shaped bars each having four bores therethrough with two bores in one leg of each U-shaped bar and two bores in the other leg of each U-shaped bar, a pair of side structures each including a pair of rods fixed in parallel spaced relation by a rectangular member welded to the rods centrally thereof, each of said rods being threaded at its distal ends and deformed adjacent its distal ends to provide abutments, each distal end of said rods being projected through a respective one of said bores, a plurality of nuts each received on a respective one of said threaded distal ends and drawing up said abutments against said U-shaped bars to provide a rigid assembly with said U-shaped bars forming the end portions thereof and said side structures forming the side portions thereof, an electric motor mounted on one of said rectangular members and having an output drive member which is formed for removable coupling to a spit, a spit having a handle on one end thereof, means slidable along and securable to said spit at any desired location along the length thereof for impaling an object to be cooked and fixing it against rotation relative to the spit, an annularly externally grooved annular member adjustably fixed to said spit, the other of said rectangular members having a semicircular recess in the upper edge thereof receiving the grooved member within the groove thereof thereby retaining said spit in said electric motor output drive member, a charcoal basket having closed sides and bottom and rear and having a foraminous forward face, said charcoal basket face being curved about a horizontal axis in a cylindrical configuration and cupped about said spit, four rings mounted on said basket two on the forward face and two on the rearward face thereof, a pair of shafts each having enlarged heads on the opposite ends thereof, said shafts each extending through a respective two of said rings to mount said basket on said shafts, said shafts resting on said side structures and movable thereon to adjust the position of said basket relative to said spit, said basket being slidable on said shafts to adjust the position of said basket relative to said spit.

References Cited

UNITED STATES PATENTS

| | | |
|---|---|---|
| 1,887,219 | 11/1932 | Stranszky. |
| 2,335,217 | 11/1943 | Tate _____ 99—421 X |
| 2,441,190 | 5/1948 | Fuller _____ 126—25 |
| 2,923,229 | 2/1960 | Halford. |
| 2,946,275 | 7/1960 | Compton _____ 99—390 |
| 3,019,720 | 2/1962 | Topper _____ 99—421 |
| 3,079,909 | 3/1963 | Bemben. |
| 3,140,651 | 7/1964 | Barnett _____ 99—419 X |
| 3,175,549 | 3/1965 | Bergsten _____ 99—412 X |
| 3,182,585 | 5/1965 | Rensch et al. _____ 99—390 X |

WALTER A. SCHEEL, *Primary Examiner.*

J. NEARY, *Assistant Examiner.*